Jan. 9, 1934.   J. S. STULL   1,943,097
ARTICLE WORKING APPARATUS
Filed Oct. 18, 1930   6 Sheets-Sheet 1

Inventor
J. S. Stull
By H. B. Whitfield Atty.

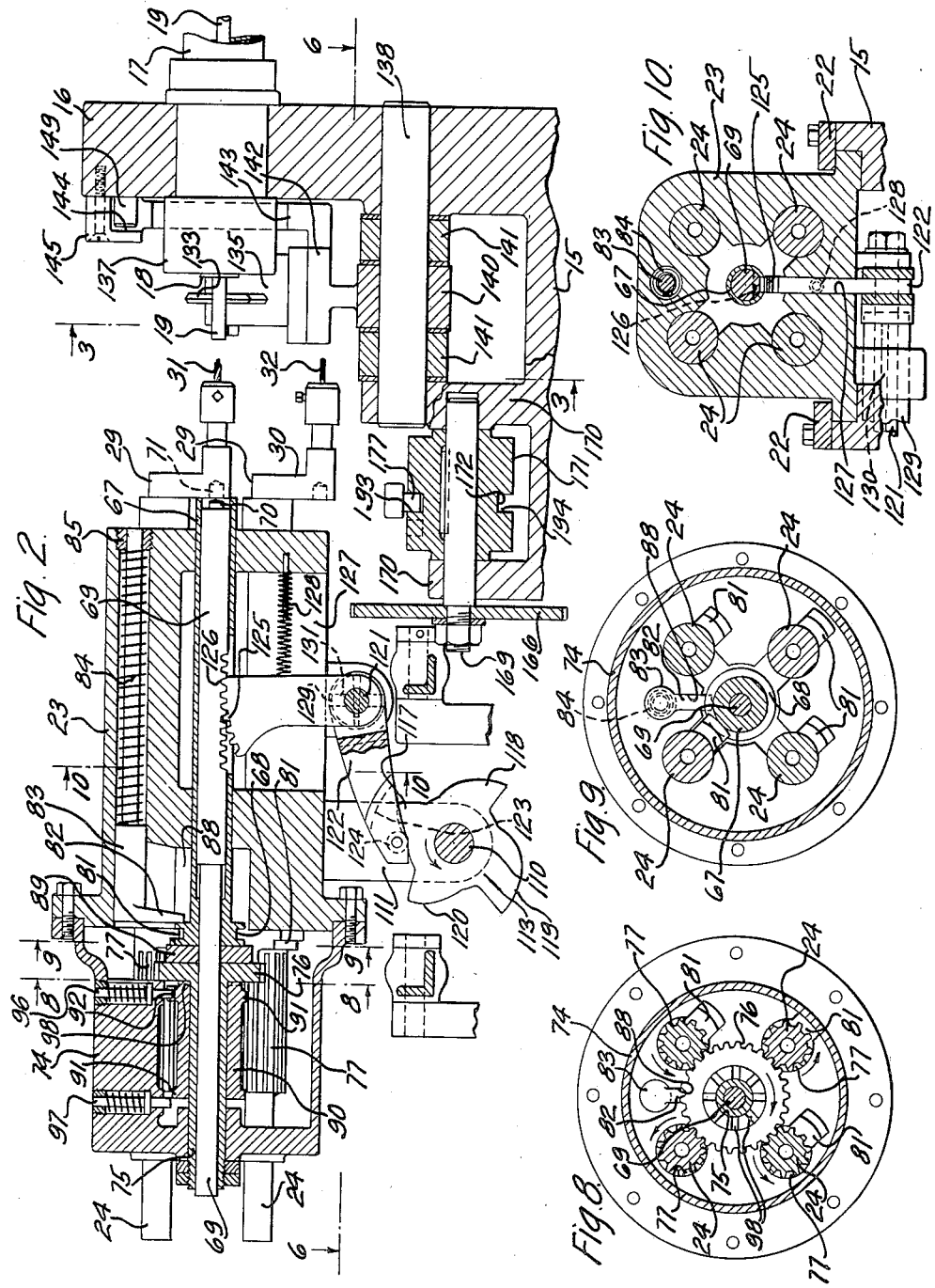

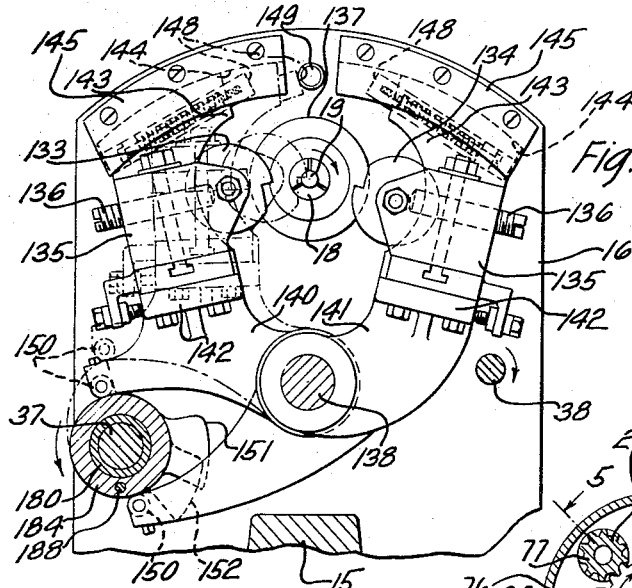
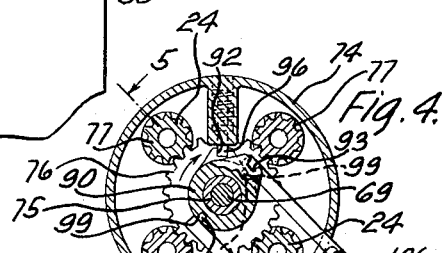
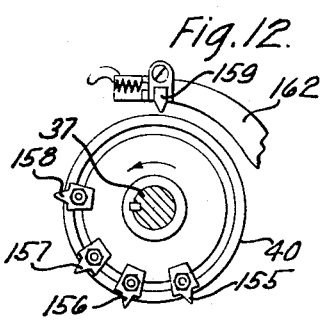
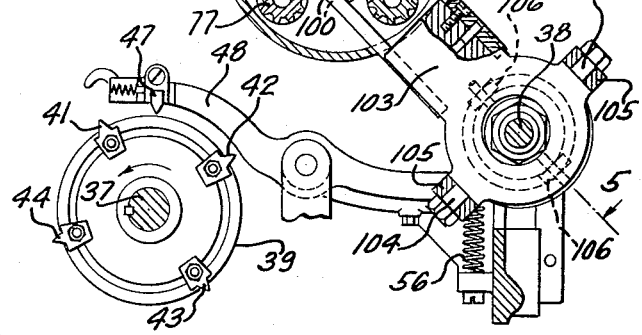
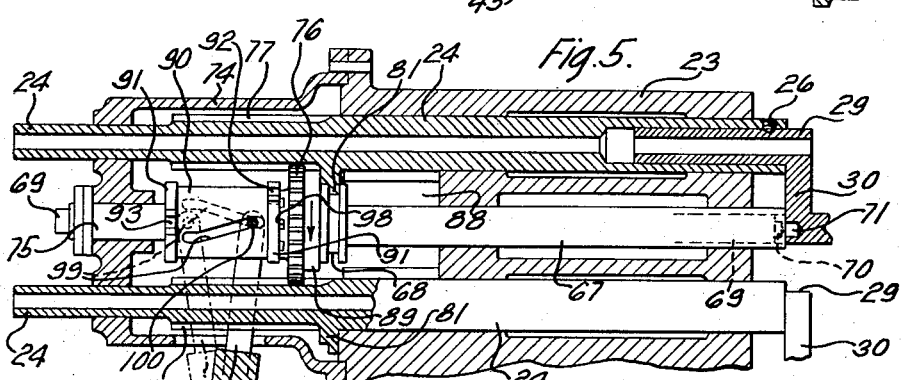
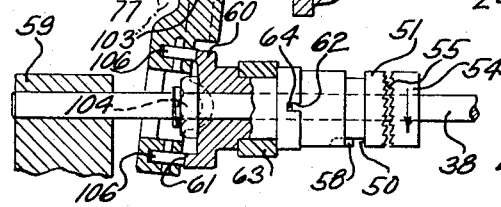

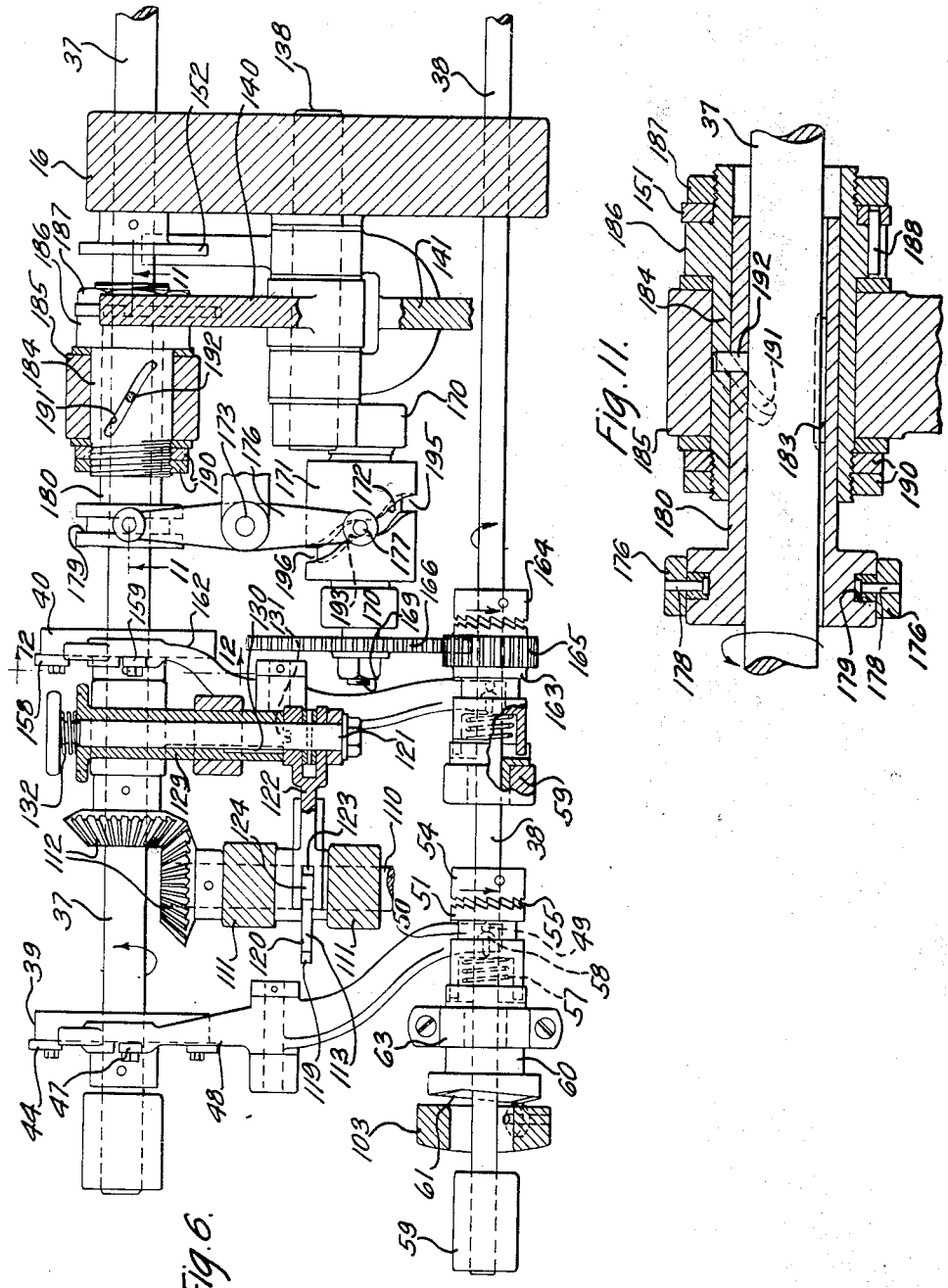

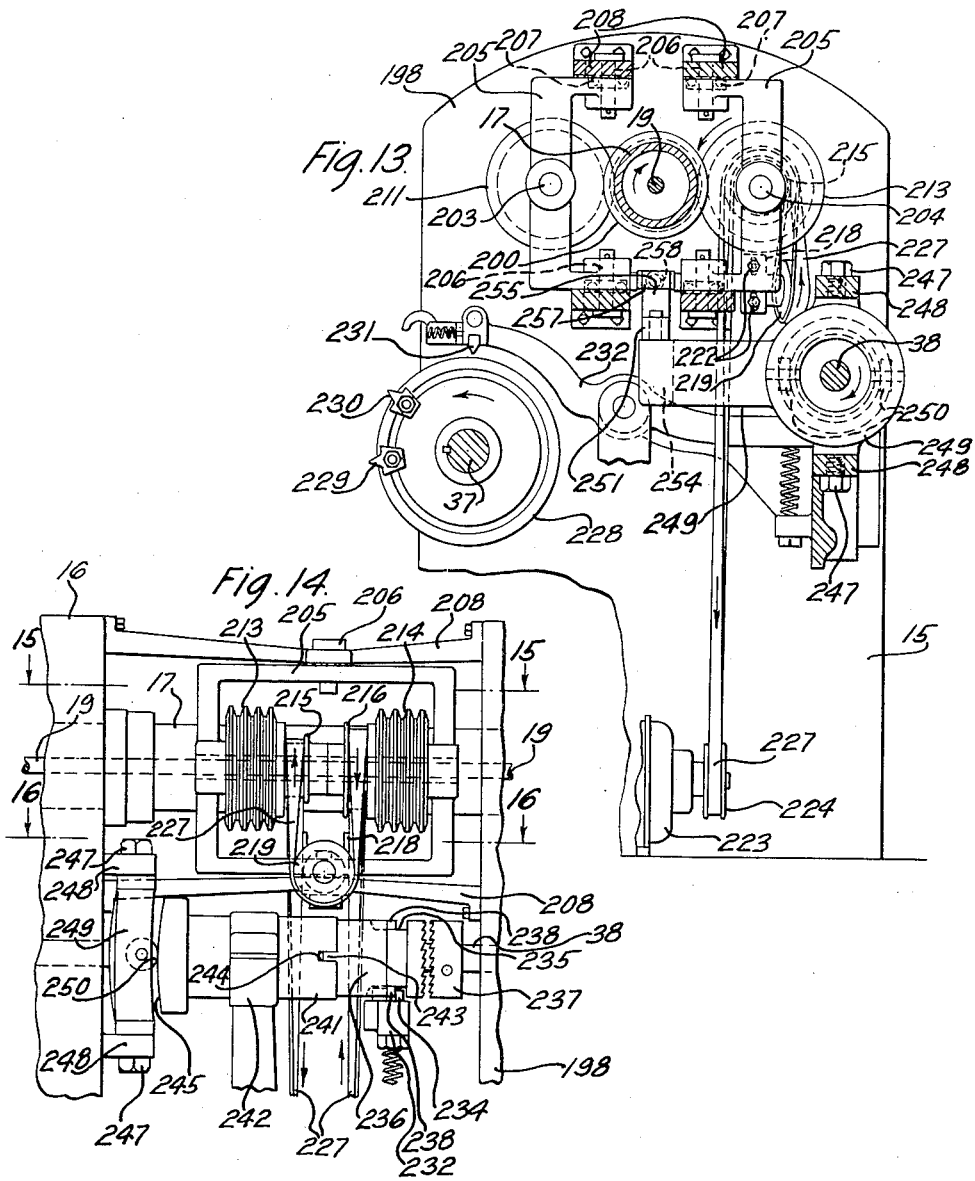

Jan. 9, 1934.   J. S. STULL   1,943,097
ARTICLE WORKING APPARATUS
Filed Oct. 18, 1930   6 Sheets-Sheet 6

Inventor
J. S. Stull
By J. H. B. Whitfield Atty.

Patented Jan. 9, 1934

1,943,097

UNITED STATES PATENT OFFICE 1,943,097

ARTICLE WORKING APPARATUS

John S. Stull, Chicago, Ill., assignor to Western Electric Company, Incorporated, New York, N. Y., a corporation of New York Application October 18, 1930. Serial No. 489,509

19 Claims. (Cl. 29—56)

This invention relates to article working apparatus, and more particularly to automatic screw machines.

The primary object of this invention is to provide a generally improved automatic screw machine whereby the organization of such a machine is simplified and its efficiency materially increased.

In accordance with one embodiment of this invention as applied to an automatic screw machine having a single work carrying spindle, the turret tools are carried upon offset arms fixed to individually rotatable and longitudinally movable spindles, the spindles being equally spaced on fixed axes and concentrically arranged around and parallel to the axis of the work spindle. Also cross slide tools are carried upon levers which are individually and rotatably supported upon a fixed shaft, the levers being movable laterally toward and from the work. Power for rotating the spindle is transmitted through two sets of grooved friction wheels mounted at opposite sides of the spindle which cooperate with similar wheels on the spindle. One set of wheels serves to drive the spindle wheels and thereby the spindle, while the opposite set functions as idlers to prevent deflection of the spindle, due to the force applied by the other wheel when in a driving relation. Rotation of the driving wheels in opposite directions at different speeds and manipulation of the wheels at each side of the spindle simultaneously so that only one of the wheels of each opposite set will be engaged at a time with the corresponding wheel on the spindle to drive the latter in one direction are effected by a driving means and a yoke mechanism for moving the wheels in timed relation with respect to each other.

Mechanism is provided for periodically indexing and guiding the tool spindles longitudinally, actuating the cross slide tool levers to move the several tools carried thereby into operative positions relative to the work, retarding and accelerating the tool levers during their normal movement to and from the work, and for manipulating the sets of grooved friction wheels for driving the work spindle in opposite directions in a predetermined sequence.

Other objects and advantages of this invention will more fully appear from the following detailed description taken in connection with the accompanying drawings, wherein Fig. 1 is a fragmentary plan view of a single spindle automatic screw machine embodying the features of this invention;

Fig. 2 is a fragmentary irregular longitudinal vertical section taken on the line 2—2 of Fig. 1;

Fig. 3 is an irregular vertical section taken on the line 3—3 of Fig. 2;

Fig. 4 is an irregular fragmentary vertical section taken on the line 4—4 of Fig. 1;

Fig. 5 is a section taken on the line 5—5 of Fig. 4;

Fig. 6 is an irregular longitudinal plan section taken on the line 6—6 of Fig. 2;

Figure 15:
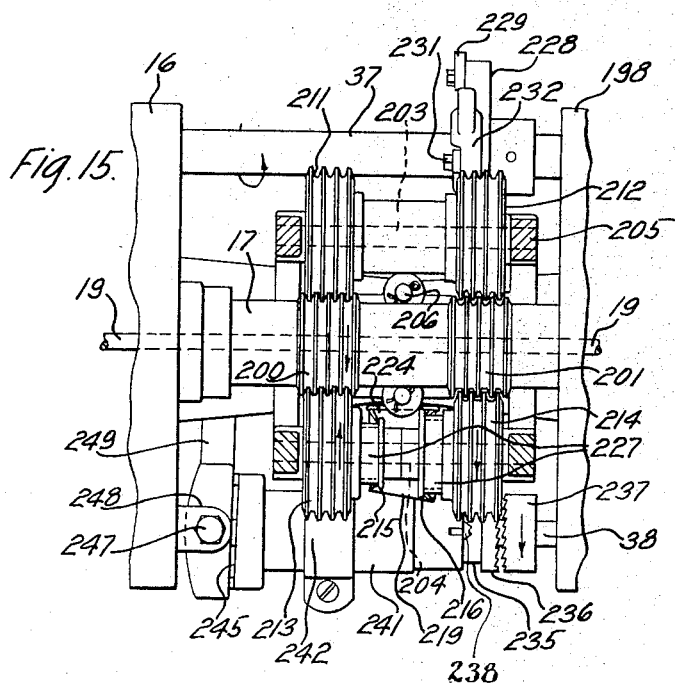
Figure 16:
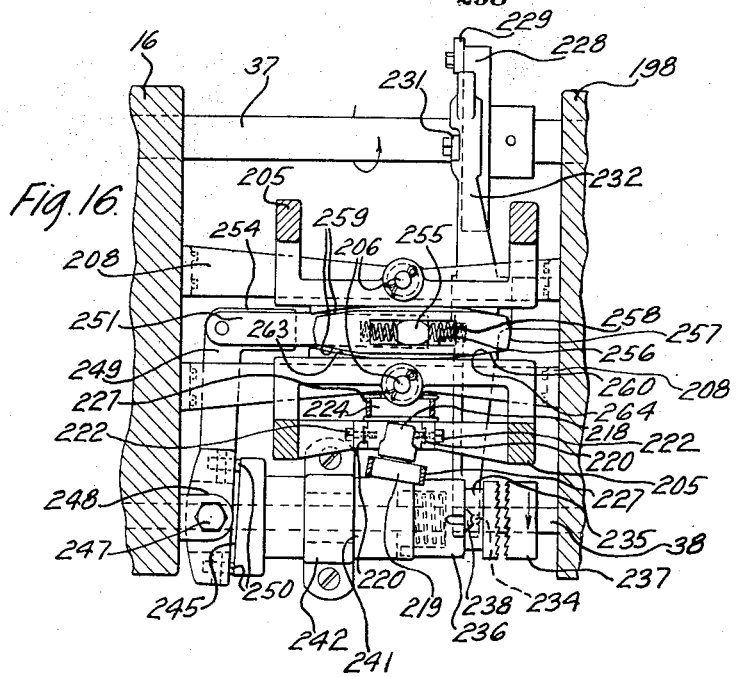

Figs. 8, 9, and 10 are detail vertical sections taken on the lines 8—8, 9—9, and 10—10, respectively, of Fig. 2;

Fig. 11 is an enlarged vertical detail section taken on the line 11—11 of Fig. 6;

Fig. 12 is a vertical section taken on the line 12—12 of Fig. 6;

Fig. 13 is a fragmentary vertical section through the machine showing the work spindle driving mechanism arranged at the right end of the machine and not shown in any of the previously described views;

Fig. 14 is a fragmentary side view of Fig. 13 looking at the right side thereof; and Figs. 15 and 16 are plan sections taken on the lines 15—15 and 16—16, respectively, of Fig. 14.

General

Figure 7:
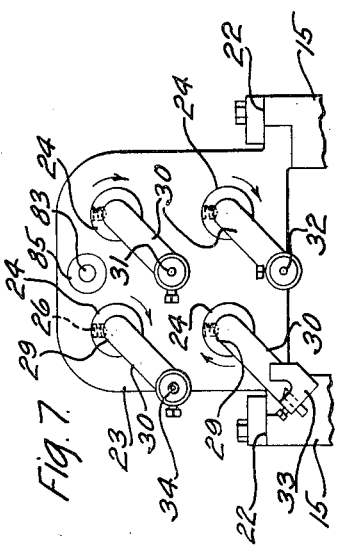
Fig. 7 is a fragmentary vertical view taken on the line 7—7 of Fig. 1.

Referring now to the drawings, and particularly to Figs. 2, 7, and 13, the numeral 15 indicates a frame or bed for the operative parts of the machine. The bed 15 is formed with an upwardly extending column 16 between its ends in which is journaled one end of a hollow rotary work spindle 17 (Figs. 2 and 13) through which the work in the form of bar or rod stock is fed, the spindle terminating in a bar stock holding chuck 18 adjacent the column 16. A bar of stock from which articles are to be formed in the operation of the apparatus is indicated at 19. The means provided for rotating the spindle 17 will be described hereinafter. For the sake of simplifying the disclosure, the mechanism for feeding the stock 19 after each cut-off operation, the details of construction of the chuck 18, the mechanism for operating them in timed relation and other parts of the mechanism which are known will not be described in detail, since they form no part of the present invention and are not necessary to a clear understanding thereof.

Longitudinally movable tools and indexing mechanism therefor

Clamped as indicated at 22 (Figs. 7 and 10) to the upper surface of the bed 15 is a tool head 23 within which are journaled, in the present instance, four rotary and longitudinally movable tool supporting spindles 24 formed with axial shouldered bores. Mounted in the right end of each of the bores of the spindles 24 (Fig. 5) and fixed to the spindle by a set screw 26 is a sleeve 29 provided with a bore substantially the same diameter as the left end (Fig. 5) of the bore formed in the spindle. At their outer ends the sleeves 29 are provided with integral right angle arms 30. Suitably fixed to the arms 30 at their free ends and extending parallel to the spindles 24 are tools 31, 32, 33, and 34 (Fig. 7), which tools in the present instance are designed and arranged to successively perform centering, drilling, boxing, and threading operations upon the stock 19 in the production of an article therefrom. The spindles 24 are equally spaced about the axis of the stock holding chuck 18 and concentrically arranged around the latter, while the length of the arm 30 and the mounting of the tool thereon is such that when the spindle 24 is rotated 90° the tool is moved into operative alignment with the chuck, as is clearly shown in Figs. 1 and 7 by the position of the centering tool 31.

Although in the present embodiment of this invention the bar stock 19 is rotated and the tools are successively advanced into operative position with the stock to form the article, in some instances it may be desirable to simultaneously rotate and advance each of the tools during the working of the stock. In the latter case a rotary drive to the tools may be readily arranged by inserting a driven shaft in the bore of the spindle 24 and sleeve 29 which are mounted upon a fixed axis and providing a driving connection from the shaft to the tool carried upon the arm 30.

Figure 1:
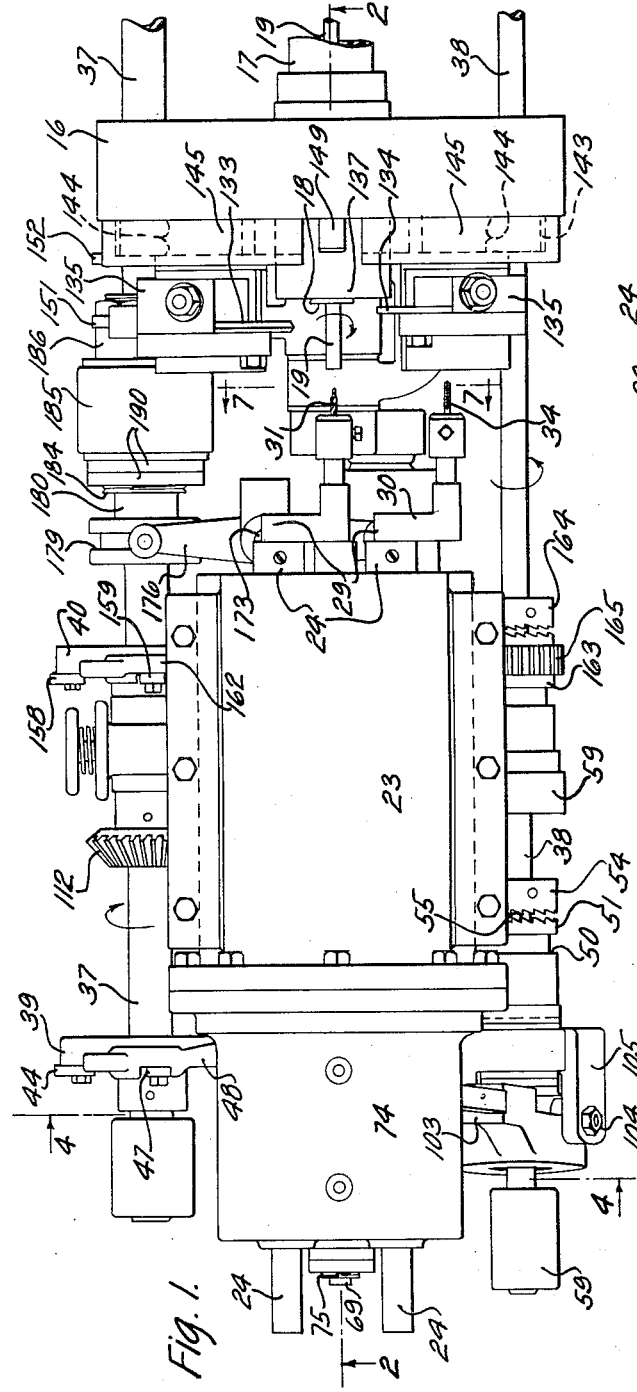

Extending longitudinally of the machine and upon opposite sides thereof, referring particularly to Figs. 1 and 6, are cam and main drive shafts 37 and 38, respectively, which in the operation of the machine are rotated continuously at predetermined different speeds by driving mechanism (not shown). These shafts serve to drive the various actuating mechanisms of the machine in a manner to be described hereinafter. Fixed upon the shaft 37 are two carriers 39 and 40 supporting circumferentially adjustable cams. Referring to Fig. 4 the carrier 39 has mounted thereon four cams 41, 42, 43, and 44 which during a counterclockwise rotation of the shaft 37 successively engage a cam 47 pivotally carried upon the end of a clutch tripping lever 48. The opposite end of the lever 48 carries a pin 49 (Fig. 6) which engages a peripheral cam groove 50 (Figs. 5 and 6) formed in a driven clutch member 51 rotatably free and slidable upon the shaft 38. Fixed to the shaft 38 is a driving clutch member 54, the clutch members 51 and 54 being provided with cooperating clutch teeth 55. A compression spring 56 (Fig. 4) operatively connected to the lever 48 serves to hold the pin 49 in the cam groove 50 until one of the cams carried by the carrier 39 moves past the cam 47 carried by the tripping lever 48, whereupon the lever is rocked in a clockwise direction (Fig. 4) about its pivot and the pin 49 is withdrawn from the cam groove 50 and a compression spring 57 surrounding the shaft 38 within the driven clutch member 51 acts to immediately slide the member 51 upon the shaft 38 to engage the teeth 55 of the member 51 with the teeth of the driving clutch member 54.

Immediately upon one of the cams carried by the carrier 39 moving past the cam 47 and withdrawing the pin 49 from the cam groove 50 the lever 48 is returned to its normal position by the spring 56 and the pin 49 is moved into the cam groove 50 again. The cam groove 50 is so designed that upon the driven clutch member 51 being revolved a single rotation a cam projection 58 in the cam groove moving into engagement with the pin 49 retracts the driven clutch member 51 from engagement with the driving clutch member 54 until the next cam upon the carrier 39 moves past the cam 47 upon the lever 48. Also rotatably free upon the shaft 38 (Figs. 5 and 6) which is journaled at its left end in a bearing 59 is a shouldered sleeve 60 provided with an annular cam face 61 at one end and a slot 62 extending parallel to the axis of the shaft 38 at its opposite end. A bearing 63 associated with the sleeve 60 is split and fits between the enlarged ends of the sleeve and prevents longitudinal movement of the sleeve upon the shaft 38. Formed upon the adjacent end of the slidable and driven clutch member 51 is a tongue 64 which is engaged at all times in the slot 62 of the sleeve 60, thereby transmitting rotary motion to the latter whenever the clutch members 51 and 54 are engaged in the manner hereinbefore described.

Mounted in the tool head 23 coaxial with the stock holding chuck 18 is a longitudinally movable sleeve 67 which projects a short distance from the right end (Figs. 2 and 5) of the head and is aligned with the inner surface of each of the arms 30, the left end of the sleeve being provided with an enlargement having an annular channel 68. Longitudinally movable within the sleeve 67 is a shouldered shaft or rod 69 terminating at its right end in a reduced portion 70 normally positioned slightly within the sleeve 67 and upon movement to the right (Fig. 2) engageable within depressions 71 formed in the inner surfaces of the arms 30 which are successively moved into alignment therewith in the operation of the apparatus by means to be presently described, the entering of the reduced portion 70 in the depression 71 serving to lock the arm 30 and consequently the tool carried thereby in alignment with the stock holding chuck 18.

Secured to the left end of the tool head 23 is a housing 74, through a bearing of which extends the reduced left end of the rod 69. Rotatably free upon the rod 69 within the housing 74 is a sleeve 75 suitably restrained from longitudinal movement and having formed thereon at its right end a gear 76 which meshes with pinions 77 formed on the shafts 24, the shafts 24 extending through the housing 74 at their left ends (Figs. 2, 5, and 8). The pinions 77 are much wider than the gear 76 so that the pinions which are longitudinally movable with the shafts 24 and the gear are always in mesh (Fig. 5). Also formed upon the shafts 24 are arms 81 normally aligned with the annular channel 68 of the sleeve 67 and movable successively thereinto. The arms 30 and 81 upon each of the shafts 24 are angularly aligned so that when the shaft is rotated 90° the arm 30 moves over the aligned right end of the sleeve 67 and the arm 81 moves into the channel 68 of the sleeve. Thereafter when the rod 69 is moved into engagement with the arm 30 by means to be presently described, to advance the tool carried thereby into operative engagement with the stock 19 held by the continuously rotating chuck 18, the sleeve 67 positively follows and serves as a stiffener for the rod 69 as it moves outwardly from the right end of the head 23, tending to minimize chattering of the tool while cutting into the stock.

The enlargement upon the left end of the sleeve 67 is engaged by an arm 82 formed on a rod 83 reciprocably carried in the head 23 directly above the rod 69 (Figs. 2 and 9). Surrounding a reduced shouldered portion of the rod 83 is a compression spring 84 engaging at opposite ends a surface of the rod and a collar 85 threaded into the head 23, the enlargement of the sleeve 67 and the arm 82 of the rod 83 being movable along an opening 88 provided in the head 23. During the advance of the sleeve 67 with the rod 69 toward the right (Figs. 2 and 5) the spring 84 is compressed and upon the return movement of the rod 69 the spring acts to return the sleeve 67 against a positive stop surface provided by a spacing collar 89 rotatably free upon the rod 69 between the opposed end surfaces of the sleeves 67 and 75, and due to the engagement of the arm 30 with the end of the rod 69 the latter is partially returned to its normal position. The means for completely returning the rod 69 to its normal position will be described hereinafter.

Rotatably and longitudinally movable upon the sleeve 75 is a cam sleeve 90 for indexing the shafts 24, successive indexing movements of the sleeve rocking the tools 31 to 34, inclusive, successively into alignment with the stock holding chuck 18. The cam sleeve 90 is formed with flanges 91 at its opposite ends, which are provided with peripheral 45° notched projections 92 and 93 offset from each other (Figs. 2, 4, and 5). Mounted in the housing 74 are spring pressed plungers 96 and 97 which ride into the notches of the projections 92 and 93, respectively, at the end of a longitudinal movement of the cam sleeve 90 in either direction. The adjacent end surfaces of the gear 76 and the cam sleeve 90 are formed with cooperating clutch teeth 98 spaced 45° apart and which are shown engaged in Figs. 2 and 5, the plunger 96 being entered in the right notched flange 91 at this time. Formed in the sleeve 90 at diametrically opposite points are cam slots 99 into which extend pins 100 carried by the furcations of a bifurcated lever 103 pivoted as indicated at 104 upon arms 105 which are attached to the frame 15. As clearly shown in Figs. 4 and 5 the lever 103 is pivoted at opposite points of the main drive shaft 38, the lever surrounding the shaft and mounting a pair of rollers 106 arranged at opposite points of the latter and 90° from the pivot points 104. The rollers 106 engage the cam face 61 of the sleeve 60, which is rotated whenever the clutch members 51 and 54 are engaged.

*Operation of tool indexing mechanism*

In the position of the parts as shown in Figs. 4 and 5, whenever one of the predeterminedly spaced cams 41 to 44, inclusive, carried by the continuously rotating carrier 39 rides past the cam 47 fixed to the clutch tripping lever 48, the pin 49 carried thereby is withdrawn from the cam groove 50 of the driven clutch member 51 and in the manner hereinbefore described rotary motion is imparted to the sleeve 60, the cam face thereof rocking the lever 103 counterclockwise, as viewed in Fig. 5, about its pivots 104. The speed of the main drive shaft 38 is high compared to the speed of the cam shaft 37 so that in one revolution of the shaft 38 the lever 103 is rocked counterclockwise from the full line position thereof shown in Fig. 5 to the dotted position thereof and back to the full line position without interruption, and during which interval the next cam upon the carrier 39 is rotating into engagement with the cam 47 of the clutch tripping lever 48. The arrangement is such that only one-eighth of a revolution of the main drive shaft 38 is required to index the tools and during the balance or seven-eighths of the revolution the tool aligned with the stock 19 is advanced, operates upon the stock and then is retracted therefrom. The counterclockwise rotation of the lever 103 advances the pins 100 carried thereby and which engage in the cam slots 99 of the sleeve 90 toward the left along a substantially straight line, and due to the particular shape of the slots and the engagement of the plunger 96 at this time in the notched projection 92 of the cam sleeve, the first part of the movement of the pins along the cam slots moves the cam sleeve 90 longitudinally along the sleeve 75 toward the left (Figs. 2 and 5) without causing its rotation.

Upon completion of this longitudinal movement of the sleeve 90 the cooperating clutch teeth 98 have been disengaged as well as the notched projection 92 and the plunger 96 and the left end of the sleeve abuts the adjacent inner face of a bearing portion of the housing 74, thus freeing the sleeve for rotary motion. Also at this time the left flange 91 of the sleeve 90 has been moved into alignment with the plunger 97. The continued movement of the pins 100 brings them to the left end of the cam slots 99 and during this latter movement the sleeve 90 is freely rotated upon the sleeve 75, 45° in a counterclockwise direction, as viewed in Fig. 4, with the plunger 97 finally dropping into the notched projection 93 of the flange 91, thus locking the sleeve 90 from rotation during the initial rotary movement of the lever 103 in a clockwise direction in its return to the position shown in Fig. 5. In this latter movement of the lever 103 a longitudinal movement of the cam sleeve 90 is first effected in a manner similar to that described in connection with the counterclockwise rotation of the lever and the clutch teeth 98 are operatively engaged, the plunger 97 and notched projection 93 disengaged and the right flange 91 of the sleeve 90 moved into alignment with the plunger 96.

As the pins 100 continue to move along the cam slots 99 the cam sleeve 90 is caused to rotate in a clockwise direction (Fig. 4) and since the clutch teeth 98 are operatively engaged the gear 76 is similarly rotated and consequently each of the shafts 24 by means of the pinions 77 thereof which mesh with the gear 76 is rotated 90° in a counterclockwise direction. Referring to Fig. 7, which is a view looking at the ends of the shafts 24 in a direction opposite to that shown in Fig. 4, it will be apparent that the shafts 24 will rotate clockwise and as the centering tool 31 carried by the arm 30, which had previously been indexed into coaxial alignment with the stock holding chuck 18, is rocked clockwise from the position shown, the drilling tool 32 will receive a like movement to align it with the chuck. At the same time the boxing and threading tools 33 and 34, respectively, each receive an indexing movement, bringing them closer into alignment with the chuck 18.

*Longitudinally movable tools—mechanism for advancing and operation thereof*

The rod 69 is periodically advanced toward the right (Fig. 2) for predeterminedly different distances in timed relation with the indexing of the tools 31 to 34, inclusive, by means receiving motion from a continuously rotating cam shaft 110. Referring particularly to Figs. 2 and 6 the shaft 110 is supported upon spaced bearings 111 and is driven at a predetermined rate from the main drive shaft 38 by a suitable gear train (not shown), the cam shaft 37 receiving motion from the cam shaft 110 by cooperating similar bevel gears 112, the shafts 110 and 37 being driven at the same rate. Fixed to the shaft 110 between the bearings 111 is a cam 113 having four lobes 117 to 120, inclusive, for causing the advance of the centering, drilling, boxing, and threading tools 31 to 34, inclusive, into operative position with the rotating stock 19. The cam 113 is rotated in a counterclockwise direction, as viewed in Fig. 2, at the same speed as the cam shaft 37. Mounted upon a rotary shaft 121 (Figs. 2, 6, and 10), is a bell crank lever 122, one arm of which is slotted, as indicated at 123, and supports a roller 124 in the slot, which roller engages the cam surface of the cam 113 and another arm of the lever terminates in a gear segment 125 which meshes with a gear rack 126 formed in the lower surface of the longitudinally movable rod 69. A slot 127 is formed in the head 23 and the sleeve 67 is also slotted as indicated to permit the movement of the lever 122 caused by the rotation of the cam 113, the latter rotating through the slot 123 in the lever. It will be apparent that as the cam 113 rotates the roller 124 will ride up one of the lobes thereof and by means of the gear segment 125 of the lever 122 and the cooperating gear rack 126 upon the rod 69 the latter will be advanced toward the right (Fig. 2) and carry with it one of the tools 31 to 34, inclusive, which was previously indexed into alignment with the stock 19 held by the continuously rotating chuck 18. In the continued rotation of the cam 113 after the tool has been advanced a predetermined distance in accordance with the contour of the particular cam lobe the roller 124 rides down the cam lobe and the spring 84 then acts to retract the sleeve 67 and the rod 69 in the manner hereinbefore described to their normal positions, as shown in Fig. 2, the reduced right end portion 70 of the rod 69 being withdrawn from the depression 71 in the tool carrying arm 30 after the sleeve has reached its normal position by a compression spring 128 arranged in the slot 127 and engaged at opposite ends with the lever 122 and a wall of the head 23, the spring being previously compressed during the advance of the tool.

Means is provided for releasing the longitudinally movable rod 69, which advances the tools successively into operative relation with the stock 19, from operative connection with the cam 113 at any point in a cycle of operation or while the machine is idle. The bell crank lever 122 is formed of two separate arms, the arm thereof having the gear segment 125 pinned to the shaft 121 as indicated, while the other arm thereof supporting the roller 124 is bifurcated at its right end and freely mounted upon the shaft at either side of the other arm. Surrounding the shaft 121 at one side of the bifurcated arm of the lever 122 is a sleeve 129 splined as indicated at 130 to rotate with the shaft, but longitudinally movable thereon. Cooperating clutch teeth and notches 131 (dotted outline Fig. 6) are formed in the abutting end faces of the sleeve 129 and the bifurcated arm of the lever 122. The shaft 121 extends beyond the outer end of the sleeve 129 and is provided with a hand grip which is spaced a short distance from a hand grip formed on the sleeve, the hand grips being conveniently positioned at one side of the machine within reach of the operator. Surrounding the shaft 121 between the adjacent faces of the hand grips is a compression spring 132 acting to normally maintain the cooperating clutch teeth and notches 131 on the sleeve 129 and the bifurcated arm of the lever 122 in clutching engagement. If for any reason it is desired to move the rod 69, which controls the movement of the tool aligned therewith, either during the operation of the machine or when it is idle, the operator pulls outwardly upon the hand grip of the sleeve 129, thereby disengaging the clutch teeth and notches 131. While the sleeve 129 is held outward against the compression of the spring 132 the hand grips are rotated and the arm of the lever 122 having the gear segment 125 alone will rotate and thus permit the rod 69 to be moved longitudinally in either direction to cause the retraction or advance of the aligned tool. When the machine is operating and the clutch teeth and notches 131 are disengaged as just described, it will be apparent that the roller arm of the lever 122 will merely idly rock up and down as the cam 113 rotates, without transmitting motion to the rod 69. Upon the operator releasing the hand grips the spring 132 acts to move the sleeve inwardly on the shaft 121 and the clutch teeth and notches 131 engage, when aligned, which occurs almost immediately, whether the machine is operating or idle.

*Laterally movable tools*

The arrangement of mounting and operating the forming and cutting off tools is illustrated in Figs. 3, 6, and 11. Forming and cutting off tools indicated at 133 and 134, respectively, are clamped upon tool posts 135 which may be adjusted for setting the tools in a well known manner and stop screws 136 are provided to insure accuracy of operation, the stop screws being limited in their movement inwardly by engaging the peripheral surface of a stationary bushing 137 surrounding the forward end of the spindle 17. Fixed to the column 16 below the chuck 18 and aligned vertically therewith is a stud shaft 138 supporting a pair of pivotal levers 140 and 141 provided with angularly disposed seat portions 142 upon which the tool posts 135 are adjustably clamped. Extending to the right and upwardly from the seat portions 142 are arms 143 (Figs. 2 and 3), which arms at their upper ends are arranged to move along a slot 144 formed between a surface of the column 16 and an arcuate guide member 145 fixed to the column 16 for preventing deflection of the levers 140 and 141 during operations of the tools 133 and 134 upon the stock 19.

Mounted in each of the arms 143 is a spring pressed plunger 148 arranged to engage a stop pin 149 fixed in the column 16 in vertical alignment with the stud shaft 138 and the chuck 18. During the inward movement of the tool energy is stored in the spring behind the plunger 148, the spring associated with the lever 140 being shown in dotted outline in Fig. 3, and when the tool starts its return movement the spring acts to hasten its initial movement away from the stock 19. The levers 140 and 141 at their lower ends terminate at diametrically opposite points of the cam shaft 37 and support rollers 150 which ride upon forming and cut-off tool cams 151 and 152, respectively, surrounding the cam shaft 37, the cams being set with respect to each other and the cam 113 so that the various tools actuated thereby operate in a predetermined sequence.

*Mechanism for accelerating and decelerating laterally movable tool*

In order to speed up the operation of the machine wherein in the particular article being produced the machine is set up for performing the following steps in the order named, centering, drilling, box tooling, forming, internal threading, and cutting off operations, means is provided for accelerating and decelerating at predetermined periods the movement of the forming tool cam 151, for example, in relation to the relatively slow movement of the cam shafts 37 and 110. The lobed cams 113, 151, and 152 are driven at a constant speed and in a counterclockwise direction (Figs. 2 and 3) from the shafts 37 and 110, except in case of the forming tool cam 151, as hereinbefore noted.

By accelerating or hastening the movement of the cam 151 in relation to the movement of the cam shaft 37 at a predetermined period in the operation of the machine, the forming tool 133 is retracted from operative relation with the bar stock 19 immediately upon completion of the forming operation at a faster rate of speed than it would be if directly driven from the shaft 37 at this period. This acceleration of the return movement of the forming tool 133 permits the latter to move out of the path of the tools being advanced from the head 23 toward the bar stock 19. These latter tools, in some instances, are large, that is, they extend radially for quite a distance from the axis of the bar stock 19, for example, the threading and box tools 34 and 33, respectively. In the case of the forming tool 133 operating with the other tools in the order hereinbefore described, if it was retracted at the ordinary speed of the cam shaft 37 it would not clear the threading tool 34 which is being advanced at the normal rate of speed of the cam shaft 37. Also, if during the working of the boxing tool 33 the forming tool 133 was moved at the normal rate of speed of the cam shaft 37, the tool 33 would not be retracted in time to clear the tool 133, which ordinarily would be moved at the normal rate of speed of the cam shaft 37, and in which case it is necessary to decelerate or retard the movement of the forming tool, and immediately upon clearing the tool 33 to accelerate its advance so that no time is lost.

The means provided for automatically accelerating and decelerating the movement of the forming tool cam 151 and thereby the forming tool 133 in timed relation with the operation of the other tools comprises the following mechanism: Adjustably secured circumferentially to the hereinbefore mentioned carrier 40 fixed to the shaft 37 are four predeterminedly spaced cams 155 to 158, inclusive (Figs. 6 and 12). The cams 155 to 158, inclusive, during each rotation of the shaft 37 successively engage a cam 159 carried by a clutch tripping lever 162. The manner of mounting the cam 159 upon the lever 162, as well as the details of the latter, are substantially similar to the hereinbefore described cam 47 and the tripping lever 48. The end of the lever 162 opposite to that mounting the cam 159 is operatively associated with a driven clutch member 163 (Fig. 6) which is rotatably free and slidable upon the shaft 38 and when the cams 155 to 158, inclusive, successively move past the cam 159 of the tripping lever 162, the driven clutch member 163 is released and caused to slide upon the shaft 38 in a manner similar to that hereinbefore described in connection with the driven clutch member 51. Upon the clutch member 163 being released, clutch teeth thereof engage similar teeth on a driving clutch member 164 fixed to the shaft 38, the clutch members 163 and 164 being automatically disengaged after one revolution of the shaft 38. The driven clutch member 163 is formed peripherally with a gear pinion 165 which meshes with a gear 166 fixed to a shaft 169 journaled in spaced bearings 170 formed on the bed 15 (Fig. 2), the gear pinion 165 having a wide face compared to that of the gear 166 so that it will at all times be in mesh with the latter. The driving ratio of the pinion 165 to the gear 166 is such that during a single revolution of the pinion 165 the gear is rotated one quarter revolution, the purpose of which will appear shortly.

Secured to the shaft 169 between the bearings 170 is a sleeve 171 having formed in its periphery an endless cam groove 172. Pivoted to the bed 15 as indicated at 173 between the shafts 37 and 169 is a lever 176 carrying at one end a pin 177 entered in the cam groove 172 of the sleeve 171, the opposite end of the lever being bifurcated as shown in Fig. 11 and carrying a pin 178 in each furcation thereof, the pin supporting a collar or roller which is entered in an annular channel 179 formed in an enlargement of a sleeve 180 fixed to rotate with the cam shaft 37 and slidable therealong by means of a spline connection 183. Surrounding the sleeve 180 is a sleeve 184 journaled in a bearing 185 formed on the bed 15. Opposite ends of the sleeve 184 are screw threaded and between the sleeve ends is a shouldered portion 186 against the right face of which (Fig. 11) is clamped, by means of a nut 187 threaded onto the sleeve, the forming tool cam 151, the shouldered portion 186 having a pin 188 which is entered in an aperture in the cam 151 for preventing relative rotation between the cam and the sleeve. Upon the left end of the sleeve 184 are threaded nuts 190, the bearing 185 being between the nuts and the left face of the shouldered sleeve portion 186 with washers therebetween. The sleeve 184 is provided with an inclined cam slot 191 into which extends a pin 192 fixed to the sleeve 180, the pin during certain periods in the operation of the machine being positioned midway between the ends of the slot, and also at which periods the pin 177 carried by the lever 176 is positioned at one or the other of diametrically opposite points 193 and 194 of the cam groove 172 (Figs. 2 and 6); other points 195 and 196 of the latter will be referred to hereinafter.

*Operation of tool accelerating and decelerating mechanism*

It will be apparent that as the shaft 37 is rotated the sleeve 184 and the forming tool cam 151 fixed to the latter will rotate with the shaft, and during such rotation if the lever 176 is rocked counterclockwise about its pivot 173, due to its operative connection with the cam groove 172 of the periodically indexed sleeve 171, the pin 192 will move toward the left (Fig. 6), and in so doing will ride along the upper end of the inclined cam slot 191 of the sleeve 184 and thereby cause a clockwise rotation thereof, as viewed in Fig. 3, or in a direction reverse to its normal direction of rotation with the shaft 37. This reverse movement of the sleeve 184 consequently retards or decelerates the movement of the cam 151 and thereby the period at which the roller 150 of the lever 140 will reach a point upon the cam lobe to move the forming tool 133 into operative engagement with the bar stock 19, thereby permitting the boxing tool 33 to be fully retracted without interference from the forming tool 133. If the lever 176 is rocked clockwise after being rocked counterclockwise, or when it is in the position shown in Fig. 6, it will also be apparent that the pin 192 will move toward the right and thereby cause a counterclockwise rotation of the cam 151 at an accelerated speed compared to the normal speed of the shaft 37 which is also rotating counterclockwise. This hastened movement of the cam 151 at one period permits the roller 150 of the lever 140 to move off the lobe of the cam sooner than would occur in the normal rate of speed of the cam shaft 37, thereby causing the forming tool 133 to clear the threading tool 34 which, as hereinbefore described, is being advanced at the normal rate of speed of the cam shaft 37. At another period after the boxing tool 33 has been cleared, the movement of the cam 151 is hastened to advance the forming tool 133 into operative relation with the stock 19.

Although the tool accelerating and decelerating mechanism has been disclosed and described as applied to the forming tool 133, it will be apparent that this mechanism can be applied to other tools of the machine with equally advantageous results in accordance with the particular set up of the tools.

*Drive for work spindle*

In Figs. 13 to 16, inclusive, there is illustrated the improved drive for the rotary work spindle 17 which is equipped with the stock holding chuck 18 at a point forward of the column 16 (Fig. 3). To the right of the column 16 (Figs. 14 and 15) is a vertical column 198 similar to the column 16 in which is journaled the spindle 17 extending between the two columns. Formed upon the spindle 17 between the columns 16 and 198 are two spaced multiple grooved friction driven wheels 200 and 201. At diametrically opposite points of the spindle 17 are shafts 203 and 204 parallelly aligned in a horizontal plane with the spindle 17 and fixed to yoke members 205 pivoted as indicated in Figs. 13 and 14 to rock about spaced vertical axes 206. The yoke members 205 are supported in ball bearings 207 at their axes 206 (dotted outline Fig. 13), the bearings being mounted in bracket arms 208 spanning the columns 16 and 198 and fixed thereto. Rotatably free upon the shaft 203 are two integral multiple grooved friction idler wheels 211 and 212 substantially similar to the wheels 200 and 201 upon the spindle 17, only considerably larger in diameter, and operatively aligned respectively therewith. Mounted to freely rotate upon the shaft 204 are two driving wheels 213 and 214 similar to the wheels 211 and 212 and operatively aligned with the wheels 200 and 201, respectively, the wheels 213 and 214 being rotatable independently of each other. The idler wheels 211 and 212, which are arranged diametrically opposite the driving wheels 213 and 214, it will be apparent, serve to resist the lateral thrust of the latter wheels upon the wheels 200 and 201 on the spindle 17.

This arrangement provides for a balanced pressure from opposite sides upon the spindle 17 and eliminates deleterious lateral deflection thereof, with the result that the spindle may be run at a very great rate of speed with a minimum tendency to heat, and with a minimum of deflection of the spindle a more accurate forming of the articles to be produced is effected. Upon their adjacent inner ends the wheels 213 and 214 are formed with belt pulleys 215 and 216, respectively, the pulley 216 being the larger diameter pulley for a purpose which will be described hereinafter.

Adjustably mounted for vertical movement upon the yoke member 205, intermediate the pulleys 215 and 216 and below the same, is a bracket 218 (Figs. 13 and 16) having journaled thereon an idler belt pulley 219. The bracket 218 is guided when adjusted upon the yoke member 205 by cooperating tongues and grooves 220 formed upon the bracket and the yoke member and when positioned is clamped to the yoke member by bolts 222 extending through slots in the yoke member and threaded into the tongues 220 of the bracket 218. Mounted on the base of the frame 15 is a motor 223 with a belt pulley 224 fixed to the shaft thereof. An endless belt 227 is looped around the motor pulley 224, the pulleys 216, 219 and 215 and back to the motor pulley 224. By adjusting the bracket 218, it will be apparent, the tension on the belt 227 may be readily changed. The motor 223 is continuously operated, the pulley 224 being rotated in a counterclockwise direction, as viewed in Fig. 13 when looking at the right end of the pulley, and consequently the belt 227, as indicated by the direction of the arrows in Figs. 13 and 14, will drive the pulleys 215 and 216 in counterclockwise and clockwise directions, respectively, and thereby the friction drive wheels 213 and 214 in corresponding directions.

The cam and main drive shafts 37 and 38, respectively, extend between the columns 16 and 198, the cam shaft having fixed thereon a third carrier 228, similar to the carriers 39 and 40 hereinbefore described, which supports two circumferentially adjustable cams 229 and 230. During each counterclockwise rotation of the shaft 37 the cams 229 and 230 engage at predetermined intervals a cam 231 carried upon the end of a clutch tripping lever 232, the details of the lever and the manner of mounting the cam thereon being substantially similar to the hereinbefore described tripping lever 48 and the cam 47. Mounted in the opposite end of the lever 232 is a pin 234 engaged in a peripheral cam groove 235 (Figs. 14 and 16) formed on a driven clutch member 236 rotatably free and slidable upon the shaft 38 and as the cams 229 and 230 move past the cam 231 of the tripping lever 232, the driven clutch member is released and caused to slide upon the shaft 38 in a manner similar to that hereinbefore described in connection with the driven clutch member 51. When the driven clutch member 236 is released, clutch teeth engage similar teeth on a driving clutch member 237 fixed to the shaft 38, the clutch members 236 and 237 being automatically disengaged after each one-half revolution of the driven clutch member 236 by means of two diametrically opposed cam projections 238 (Figs. 14 and 16) provided in the cam groove 235 which successively move into engagement with the pin 234 and retract the driven clutch member from engagement with the driving clutch member until one of the cams upon the carrier 228 again trips the clutch tripping lever 232.

A shouldered sleeve 241 is mounted to freely rotate upon the shaft 38 at the left end of the driven clutch member 236, a split bearing 242 in which the sleeve 241 surrounding the shaft 38 is journaled fitting between enlarged ends of the sleeve prevents longitudinal movement thereof. A cooperating tongue 243 and a slot 244 (Fig. 14) upon the adjacent ends of the slidable driven clutch member 236 and the sleeve 241, respectively, which are in operative engagement at all times, permits rotary motion to be transmitted to the sleeve whenever the clutch members 236 and 237 are engaged. The sleeve member 241 at its right end is provided with a cam face 245. Pivoted vertically, as indicated at 247 (Fig. 16) between lugs 248 upon the column 16 is a lever 249 carrying a pair of rollers 250 which ride upon the cam face 245. Referring particularly to Figs. 13 and 16, one end of the lever 249 is pivoted to a link 251 extending between and centered with the opposed pivotal yoke members 205 and having a bearing upon an arm 254 integral with the lever 249. The inner end of the link 251 is provided with a vertical arm 255 which extends upwardly through an elongated slot 256 (Fig. 16) in a wedge plate 257 supported freely upon the upper surface of the link 251. Mounted in depressions in the wedge plate 257 at opposite ends of the slot 256 are compression springs 258 engaging at their inner ends opposite sides of the arm 255 of the link 251. The springs 258, it will be apparent, provide means to compensate for wear on the cooperating parts. At each end of the wedge plate 257 the vertical sides thereof are tapered inwardly for a distance to provide camming surfaces, as indicated at 259 and 260. The opposed vertical sides of the yoke members 205 adjacent each end thereof are formed with camming surfaces 263 and 264 which are parallel to and aligned with the camming surfaces 259 and 260, respectively.

*Operation of work spindle drive*

In the production of an article from the stock 19 in which a right hand thread is to be cut in the cylindrical wall of the aperture formed by the drilling tool 32 it will be apparent that the stock 19 should be rotated counterclockwise and at a suitable speed. During the centering, drilling, boxing, forming, threading off, and cut-off operations the stock 19 is rotated in a clockwise direction at a high speed compared to the speed at which the threading operation should be performed. Therefore, it is necessary upon completion of the forming operation by the tool 133 to reduce the speed of rotation of the stock rotating spindle 17 and also to reverse its direction of movement from clockwise to counterclockwise before the threading tool 34 engages the stock 19 and immediately upon completion of the threading operation to again reverse its direction of rotation and increase the speed thereof to its former speed as the tool 34 is threaded out of the threaded aperture in the stock 19.

At a predetermined period in the counterclockwise rotation of the cam shaft 37 or upon completion of the forming operation the cam 229 upon the carrier 228 engages the cam 231 upon the tripping lever 232 and the driven clutch member 236 is released and in the manner hereinbefore described causes the cam face 245 to rotate with the shaft 38. Upon the driven clutch member 236 rotating one-half of a revolution with the driving clutch member 237 it is disengaged from the driving clutch member 237 in the manner hereinbefore described. The motion of the cam face 245 during this one-half revolution of the clutch member 236 serves to rock the lever 249 in a counterclockwise direction (Fig. 16) about its pivot 247, thus drawing the link 251 towards the left and by means of the vertical arm 255 thereof yieldably connected to the wedge plate 257 by the cooperating springs 258, the wedge plate is moved to the left (Fig. 16). This movement of the wedge plate 257 disengages the camming surfaces 260 at the right end thereof from the camming surfaces 264 of the yoke members 205 and in the engagement of the camming surfaces 259 at the left end of the plate 257 with the camming surfaces 263 of the yoke members 205 the latter are simultaneously rocked in opposite directions about their pivots 206. As a result of this movement of the yoke members 205 the friction wheels 211 and 213 are rocked out of engagement with the friction wheel 200 on the work spindle 17 and simultaneously therewith the wheels 212 and 214 are moved into engagement with the wheel 201 on the spindle 17. Since the driving wheel 214 is rotating clockwise the driven wheel 201 on the spindle 17 will be rotated counterclockwise, the desired direction of rotation of the stock 19 during the threading operation and with the larger diameter driving pulley 216, fixed to the wheel 214, the speed of rotation of the spindle 17 will also be reduced to a suitable speed for the threading operation.

Thereafter in the continued rotation of the cam shaft 37 and upon completion of the threading operation the cam 230, in the manner hereinbefore described in connection with the cam 229, releases the driven clutch member 236, which again is rotated one-half revolution, during which period the yoke members 205 are rocked about their pivots 206 by the movement of the wedge plate 257 towards the right to the position shown in Fig. 16. The friction wheels 212 and 214 are thus disengaged from the wheel 201 on the spindle 17, and the wheels 211 and 213 are moved into engagement with the wheel 200 of the spindle, which causes the latter and stock 19 carried thereby to be again rotated clockwise and at a relatively higher speed than during the threading operation in preparation for the threading off operation which immediately follows.

*Operating cycle*

It is believed from the foregoing description of the improved automatic screw machine that the manner of rotatably indexing and longitudinally moving the several turret tools successively into operative position with the continuously rotating work and of actuating the cross slide tools laterally into operative position with the work in timed relation therewith and for accelerating and decelerating the movements of the cross slide forming tool 133 during predetermined periods of such movements and also the predetermined intermittent driving of the work carrying spindle in opposite directions at different speeds and supporting the same from deflection will be clearly apparent. However, it may be well to indicate, by way of summary, what such general operation involves, for although in connection with the description of each of the several mechanisms of the automatic screw machine an endeavor has been made to set forth the method of operation of such particular mechanism, it has been necessary to defer until after all these mechanisms have been so described a statement of the manner in which their operations are correlated to achieve the desired result.

It will be assumed for the purpose of this general description that the proper tools 31 to 34, inclusive, for respectively performing centering, drilling, boxing, and threading operations upon the stock 19 have been fixed to the arms 30 of the spindles 24 and also suitable forming and cutting off tools 133 and 134 have been properly mounted upon the pivotal levers 140 and 141, respectively. Also, it will be assumed that the cams 41 to 44, inclusive, 155 to 158, inclusive, and 229 and 230 have been adjusted upon the carriers 39, 40, and 228, respectively, and the lobed cams 113, 151 and 152, the several cam faces 62 and 245, cam slots 99 and 191, and the cam groove 172 have all been formed and adjusted relative to each other to time correctly the periodic movements to be effected thereby.

Beginning the cycle of operations with the centering tool 31 in its indexed position coaxial with the rotating stock 19, as shown in Figs. 1 and 7, the stock 19 at this time rotating clockwise at high speed (Fig. 3), the lobe 117 of the cam 113 which is being rotated counterclockwise (Fig. 2) rocks the lever 122 clockwise, the roller 124 thereof riding up the cam lobe 117, and in the manner previously described the tool 31 is longitudinally advanced into operative engagement with the rotating stock 19 for a predetermined distance to perform the well known centering operation in preparation for the drilling operation which immediately follows. In the continued rotation of the cam 113 the roller 124 rides down the cam lobe 117 and the spring 84 which was compressed during the advance of the tool 31 acts to return the sleeve 67 against the spacing collar 89, the rod 69 thereafter being returned to its normal position, as shown in Fig. 2, due to the action of the spring 128 as hereinbefore described.

During the return of the centering tool 31 the cam 42 mounted upon the carrier 39 is nearing engagement with the cam 47 of the clutch tripping lever 48 and immediately upon this return of the parts the roller 124 rides upon a slight dwell surface on the cam 113 between the lobes 117 and 118, and during this period the lever 48 is rocked clockwise which, in the manner previously described in detail, effects the engagement of the driven and driving clutch members 51 and 54, respectively, and consequently each of the shafts 24 will be rotated clockwise 90°, the centering tool 31 being displaced from axial alignment with the stock 19 and the drilling tool 32 coaxially aligned therewith at the same time the boxing and threading tools 33 and 34, respectively, being indexed a step nearer their final alignment with the stock 19. Thereafter the clutch members 51 and 54 are disengaged.

As the cam 113 continues to rotate, the lobe 118 thereof causes the lever 122 to be again rocked clockwise and, in a manner similar to that described in connection with the advance into operative position of the centering tool 31 and the return thereof, the drilling tool 32 is longitudinally advanced to drill an aperture in the rotating stock 19 and then returned to its normal position. Following this the clutch members 51 and 54 are again engaged as the cam 43 of the rotating carrier 39 engages the cam 47 of the tripping lever 48, thereby setting in motion the mechanism which indexes the tool carrying spindles 24, as hereinbefore described, and the boxing tool 33 is rocked into alignment with the rotating stock 19, the clutch members thereafter being disengaged. The continuing rotation of the cam 113 causes the lobe 119 thereof to rock the lever 122 again in a clockwise direction and consequently the boxing tool 33 is moved longitudinally into operative relation with the rotating stock 19 and then returned to its normal position.

In the particular set up of tools, hereinbefore described, the laterally movable forming tool 133, as previously mentioned, receives its motion from the cam 151 operatively connected to the cam shaft 37, which also rotates at the same rate as the shaft 110 carrying the cam 113 and during the successive actuations of the centering, drilling, and boxing tools 31, 32, and 33, respectively, the forming tool 133 is in its retracted position, as is clearly evident, referring to Fig. 3, by the position of the roller 150 relative to the beginning of the rise in the cam 151. If the forming tool 133 continued to advance at the normal rate of speed of the cam shaft 37 it would interfere with the return of the boxing tool 33, as hereinbefore described; consequently at a predetermined period during the counterclockwise rotation of the cam 151 with the shaft 37, the cam 155 of the carrier 40 engages the cam 159 of the clutch tripping lever 162 and the engagement of the driven and driving clutch members 163 and 164, respectively, is effected. The engagement of the clutch members 163 and 164 transmits rotary motion from the shaft 38 to the sleeve 171, which is rotated counterclockwise one quarter of a revolution, and by means of the cam groove 172 thereof, the lever 176 carrying the pin 177, which engages in the cam groove 172, is rotated counterclockwise and consequently the pin 192 of the sleeve 180 will move toward the left (Fig. 6) in the inclined cam slot 191 of the sleeve 184 and in the manner previously described cause a clockwise rotation of the cam 151, which is normally rotating counterclockwise (Fig. 3), thereby retarding the movement of the forming tool 133 toward the rotating bar stock 19 sufficiently to permit retraction of the boxing tool 33 without interference from the forming tool 133, the clutch members 163 and 164 then being disengaged with the pin 177 of the lever 176 positioned at the point 195 of the cam groove 172.

Immediately thereafter the cam 156 of the carrier 40 trips the lever 162 and the clutch members 163 and 164 are again engaged and the sleeve 171 is rotated another quarter revolution, the lever 176 being rocked clockwise and thereby causing the pin 192 to be moved along the slot 191 toward the right end thereof, the clutch members 163 and 164 being disengaged when the pin 192 is positioned intermediate the ends of the slot 191, as shown in Fig. 6, and the pin 177 of the lever 176 positioned at the point 194 of the cam groove 172, which point is opposite the point 193. During this last movement of the pin 192 along the slot 191 it will be apparent that the cam 151 will be rotated counterclockwise at an accelerated rate of speed compared to the normal speed of the shaft 37, thereby causing the forming tool 133 to quickly advance into operative relation with the rotating bar stock 19 and complete the forming operation without any lost time after the boxing tool 33 is sufficiently retracted. At a predetermined period during the latter part of the forming operation by the tool 133 the cam 44 of the carrier 39 engages the cam 47 of the tripping lever 48 and the tool carrying spindles are again indexed and the threading tool 34 is rocked into coaxial alignment with the bar stock 19, which is rotating at this time at a reduced speed in a counterclockwise direction, as hereinbefore described.

When the roller 150 is about to ride off the high point of the cam 151 to cause the return of the forming tool 133 the lobe 120 of the cam 113 causes a rocking of the lever 122 again in a clockwise direction and the threading tool 34 is moved longitudinally into operative relation with the counterclockwise rotating stock 19 and forms a thread in the wall of the aperture thereof, which aperture was formed during the drilling operation. During the advance of the threading tool 34 towards the stock 19 the speed of rotation of the stock is reduced and its direction of rotation is reversed from clockwise to counterclockwise in the manner hereinbefore described in detail when the cam 229 upon the carrier 228 engages the cam 231 upon the clutch tripping lever 232. At this time the forming and threading tools 133 and 34 are being retracted and advanced, respectively, at the ordinary speed of the cam shaft 37 and in order to avoid interference therebetween the forming tool 133 is retracted at an accelerated rate of speed. The cam 157 of the carrier 40 at a predetermined period trips the lever 162 and the clutch members 163 and 164 are again engaged, which results in the sleeve 171 being given another quarter revolution, the lever 176 being rocked clockwise and the pin 192 moving to the right end of the slot 191, and consequently rotating the cam 151 counterclockwise (Fig. 3) at an accelerated rate of speed compared to the normal rate of speed of the shaft 37 and causing the roller 150 to ride off the high point and down to the low point of the cam 151 to retract the forming tool 133 out of the path of the advancing threading tool 34.

Upon completion of the threading operation and preceeding the retraction of the threading tool 34 the cam 230 engages the cam 231 and in the manner hereinbefore described effects a reversal in the direction of rotation of the stock 19 from counterclockwise to clockwise, and also causes its rotation at the higher rate of speed. This change of direction of the stock 19, it will be apparent, permits the threading tool 34 to be threaded out of the stock as the tool is retracted. While the threading tool 34 is clearing the stock 19 the cutting off tool 134 is actuated by the movement of the cam 152 and the completed article is severed from the stock 19. In the continued operation of the machine the chuck 18 releases its hold upon the bar stock 19 which is then fed forward a prescribed distance for the next article to be formed and then the chuck is actuated to again grip the stock. In timed relation with the feeding of the stock 19 the cam 41 on the carrier 39 engages the cam 47 of the clutch tripping lever 48 and in the manner previously described in detail in connection with the indexing of the drilling tool 32 into coaxial alignment with the bar stock 19 the centering tool 31 is similarly aligned. This completest one cycle of operation of the hereinbefore described automatic screw machine, during which cycle one article is produced for each revolution of the cam shaft 37.

It is evident from the herein detailed description of the improved automatic screw machine that due to the manner of mounting the tools upon individual rotary spindles with only a very short rotary movement necessary to index them into alignment with the stock, the idle time of the machine is considerably reduced, with the result that the productive time thereof is very greatly increased. Also, that by means of the mechanism for accelerating and decelerating the movement of the laterally movable forming tool at predetermined intervals in the cycle of the machine a further increase in the productive time of the machine is effected. Furthermore, by means of the improved friction drive for the rotary work spindle which reduces lateral deflection of the spindle to a minimum, the latter may be operated at a very great rate of speed with a minimum tendency of overheating the bearings, with the result that the maintenance of the machine is reduced.

While the invention has been described with reference to a particular embodiment thereof, it will be understood that it may be embodied in various forms, and that it is limited only by the terms of the appended claims.

What is claimed is:

1. In an article working apparatus, article holding means, a plurality of working tools adjacent the article and movable along endless paths about individual axes into operative alignment with the article, means for periodically moving each of the tools into alignment with the article, means for causing a relative longitudinal advance between the aligned tool and the article to engage the same operatively, and means for causing relative movement between the advancing tool and the article holding means to cause a working of the article.

2. In an article working apparatus, article holding means, a plurality of working tools adjacent the article, the tools being movable in circular paths about different axes into operative alignment with the article and movable longitudinally thereof, means for periodically moving and longitudinally advancing each of the tools individually into operative engagement with the article, and means for causing relative rotation between the advancing tool and the article holding means to cause a working of the article.

3. In an article working apparatus, a frame, article holding means, a head on the frame adjacent an article, a plurality of working tools movable in circular paths about individual fixed axes on the head into operative alignment with the article and longitudinally movable thereof, means for periodically successively revolving and longitudinally advancing each of the tools individually into operative engagement with the article, and means for causing relative rotation between the advancing tool and the article holding means to cause a working of the article.

4. In an article working apparatus, a frame, article holding means, a head on the frame adjacent an article, a plurality of working tools revolvably mounted on the head about fixed individual axes concentrically arranged relative to the longitudinal axis of the article, said tools movable into operative alignment with the article and longitudinally movable thereof, means for periodically revolving the tools in the same direction to successively align each tool with the article, means for thereafter effecting a predetermined longitudinal advance of the tool into operative engagement with the article, and means for causing a relative rotation between the advancing tool and the article holding means to cause a working of the article.

5. In an article working apparatus, a frame, a head thereon, a plurality of spindles having offset arms rotatably and longitudinally movable in the head, working tools associated with the arms of the spindles, article holding means adjacent the working ends of the tools, means for rotating in the same direction and lonigtudinally moving the spindles individually in the head to revolve and advance the tools successively into operative engagement with the article, and means for causing a relative rotation between the advancing tool and the article holding means to cause a working of the article.

6. In an article working apparatus, a frame, article holding means, a head on the frame adjacent an outer end of the article, a plurality of spindles rotatable and longitudinally movable on fixed axes in the head, said spindles concentrically arranged relative to the longitudinal axis of the article, means for associating working tools with the spindles for movement thereby in circular paths about individual axes co-axial with the axes of the respective spindles into operative alignment with the article, means for periodically imparting a rotary movement to each of the spindles in the head to revolve the tools associated therewith individually into alignment with the article and thereafter a predetermined longitudinal advance thereof into operative engagement with the article, and means for causing a relative rotation between the advancing tool and the article holding means to cause a working of the article.

7. In an article working apparatus, a frame, article holding means journaled on the frame, a fixed head adjacent an outer end of the article, a plurality of spindles on fixed axes in the head, said spindles concentrically arranged relative to the longitudinal axis of the article, means for mounting working tools on the spindles for movement therewith about individual axes co-axial with the axes of the respective spindles into operative alignment with the article, a driving element operatively connected to each of the spindles for imparting thereto an equal intermittent rotary movement in the same direction for successively moving the tools into alignment with the article, reciprocable means in the head for successively and longitudinally advancing the tools upon being moved into alignment with the article into operative engagement therewith, means for actuating the driving element and the reciprocable means in predetermined sequence, and means for continuously rotating the article holding means to cause a working of the article by the advancing tool.

8. In an article working apparatus, article holding means, a plurality of working tools, levers for supporting the tools, the levers pivotally movable about a common axis, the tools supported upon the levers between their axis and an end of the levers, means cooperating with said end of the levers for preventing deflection of the levers during the working of the article by the tools, means for causing a relative rotation between the tools and the article, and means operatively associated with the opposite ends of the levers for rocking the levers laterally of the axis of rotation of the article to advance the tools into engagement with the article.

9. In an article working apparatus, article holding means, a working tool, means for causing a relative rotation between the tool and the article, means for moving the tool at a predetermined rate of speed into operative engagement with the article and thereafter effective to permit its return, and means operatively associated with the tool actuating means for accelerating and decelerating the movements of the tool at predetermined periods.

10. In an article working apparatus, article holding means, a plurality of working tools disposed laterally of the axis of rotation of the article, means for causing a relative rotation between the tools and the article, means for actuating the tools laterally to and from operative engagement with the article at a predetermined rate of speed, and means operatively associated with the tool actuating means for accelerating and decelerating the predetermined rate of advance and retraction of the tools relative to the article at predetermined periods.

11. In an article working apparatus, article holding means, a working tool, a pivotal member for supporting the tool for movement laterally of the axis of rotation of the article, means for causing a relative rotation between the tool and the article, continually moving means operatively connected to the member for advancing the tool into operative engagement with the article and thereafter effective to permit its return, and means operatively connected to the advancing means for the tool supporting member effective at predetermined periods for accelerating and decelerating the movement thereof.

12. In an article working apparatus, article holding means, a plurality of working tools adjacent an end of the article, means for periodically revolving the tools about their individual fixed axes into operative alignment with the article and thereafter effecting a predetermined longitudinal advance of the tool into operative engagement with the article, a plurality of working tools disposed laterally of the axis of rotation of the article, means for moving the last mentioned tools to and from operative engagement with the article at a predetermined rate of speed, means operatively associated with said tool moving means effective for accelerating and decelerating the predetermined rate of advance and retraction of the tools relative to the article in timed relation with the longitudinal advance of the tools into alignment with the article, and means for rotating the article holding means to cause a working of the article by the engaged tool.

13. In an article working apparatus, article holding means, a plurality of tools mounted for movement along different endless paths, and means for moving said tools simultaneously along their respective paths to successively advance them into working alignment with the article.

14. In an article working apparatus, article holding means, a plurality of tools bodily movable about different axes, and means for moving said tools step by step about their respective axes to successively advance them into working alignment with the article.

15. In an article working apparatus, article holding means, a plurality of tools movable about individual axes, and means for moving the tools simultaneously in the same direction about their respective axes to successively advance them into working alignment with the article.

16. In an article working apparatus, article holding means, a plurality of tool supporting spindles revolvable about individual fixed axes, said spindles concentrically arranged relative to the longitudinal axis of the article, tools carried on the spindles for movement therewith, and means for rotating the spindles simultaneously to revolve the tools successively into operative alignment with the article, said means including a common driving gear arranged coaxial with the article, and pinions on each of the spindles for operatively connecting the same with the driving gear.

17. In an article working apparatus, article holding means, a tool head, a plurality of tool supporting spindles rotatable and slidable in the head and supporting tools which are offset with respect to the axes of rotation of the spindles for movement in individual circular paths extending through the longitudinal axis of the article holding means, means for imparting a periodic rotation simultaneously to each of the spindles to successively move each of the tools into axial alignment with the article and thereafter longitudinally advancing the aligned tool into operative engagement with the article, and means for causing relative rotation between the advancing tool and the article holding means to cause a working of the article.

18. In an article working apparatus, article holding means, a plurality of rotatable and slidably mounted spindles supporting tools on portions thereof offset with respect to the axes of rotation of the spindles for movement in individual circular paths extending through the longitudinal axis of the article holding means, means for periodically rotating each of the spindles to align the tool carried thereby coaxially with the article, a slide movable coaxially of the article for advancing the aligned tool into operative engagement with the article, the slide provided with means at its forward end engageable in cooperating depressions in the offset portions of the tool spindles for locking the tools successively in coaxial relation with the article, and means for causing relative movement between the advancing tool and the article holding means to cause a working of the article.

19. In an article working apparatus, article holding means, a plurality of tool holding members rotatable about individual axes spaced from an article in said holding means, tools carried by the members for movement therewith, and means for rotating the members simultaneously about their respective axes to revolve the tools successively into operative alignment with the article.

JOHN S. STULL.